United States Patent Office 3,039,847
Patented June 19, 1962

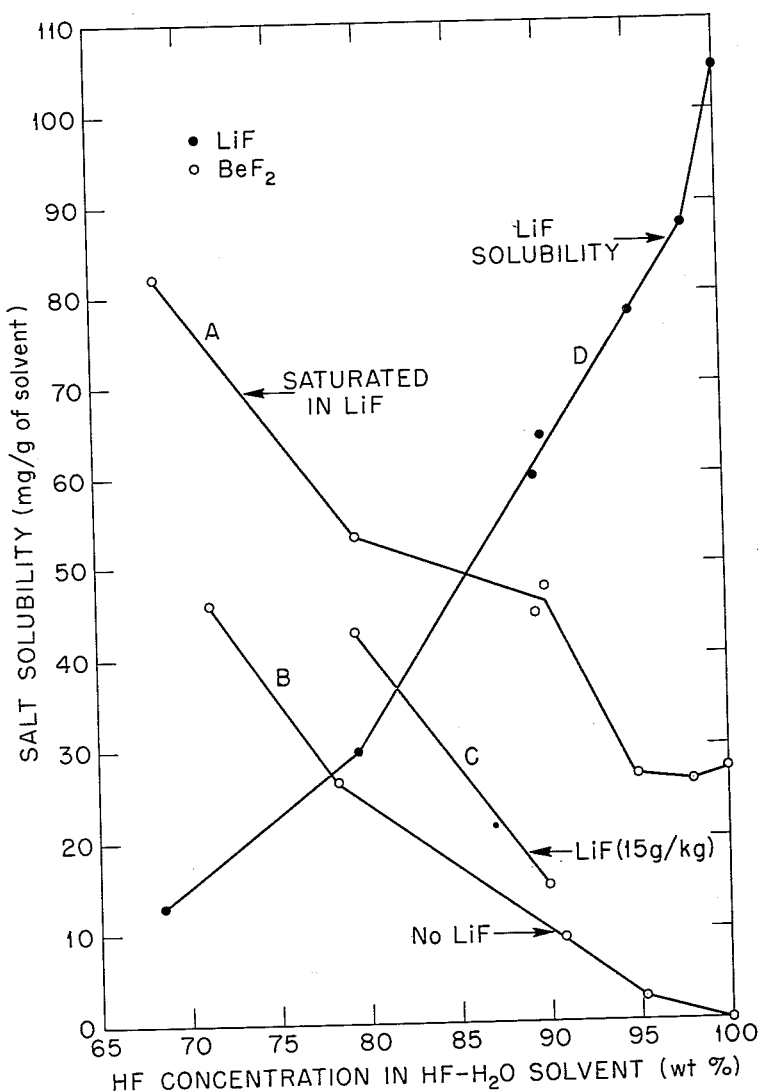

3,039,847
SEPARATION OF METAL VALUES FROM
NUCLEAR REACTOR POISONS
David O. Campbell, Oak Ridge, and George I. Cathers,
Knoxville, Tenn., assignors to the United States of
America as represented by the United States Atomic
Energy Commission
Filed Sept. 23, 1959, Ser. No. 841,912
14 Claims. (Cl. 23—14.5)

This invention is concerned with the decontamination of fissionable and fertile materials and solvent carriers for said materials to remove nuclear reactor poisons therefrom. More particularly, it relates to a method of separating beryllium and lithium values from nuclear reactor poisons. This invention is primarily concerned with decontamination from nuclear reactor poisons of the rare earth series, i.e., those having an atomic number in the range 57 to 71, and neptunium.

The ability of certain fused fluoride salts to dissolve uranium and/or thorium has led to the development of molten salt fuel systems for nuclear reactors. A fused salt system consisting of a mixture of beryllium fluoride and lithium fluoride enriched in its lithium-7 isotope has been proposed for use as a carrier or solvent for a fissionable and fertile element, the fissionable element being selected from the group uranium-233, uranium-235, and plutonium-239; and the fertile element being selected from the group uranium-238 and thorium-232. For a description of a reactor which can utilize a fluoride salt system as a reactor fuel system, reference may be had to Nuclear Science and Engineering, vol. 2, 797–853, 1957, and to Fluid Fuel Reactors, Part II, pages 569–696, Addison-Wesley Publishing Company, 1958.

Fused salt systems have a number of desirable features which make them useful as reactor fuels. The system as a whole is thermally and chemically stable under the neutron fluxes experienced in a nuclear reactor. The constituents of a solvent system which contains fluorine, beryllium, and lithium-7 are particularly desirable in that these elements have low capture cross-sections for neutrons. Beryllium also serves as an excellent neutron moderator. In addition, a mixture of lithium fluoride and beryllium fluoride has satisfactory flow properties and heat transfer characteristics so that it may serve as an excellent heat source for a steam power plant. This molten salt system also has the desirable properties common to most fluid fuel systems, these being (1) a high negative temperature coefficient of reactivity and (2) the possibility of continuous fission product removal.

The individual components of the molten salt fuel system previously described are all economically valuable materials. If a fission product-laden system could not be processed to remove the nuclear poisons generated during reactor operation, valuable reactor fuel components could not be reused and hence a serious cost burden would be imposed on the cost of operating a nuclear reactor for power or for other purposes.

It is one of the principal objects of this invention to remove nuclear poisons from a fused salt system of the kind hereinbefore characterized. Another object of this invention is to separate fission products having an atomic number in the range 57 to 71 from a mixture of certain selected metal salt fluorides. A specific object of this invention is to recover lithium and beryllium values from a composition containing said values together with neptunium and fission product nuclear poisons. Still another object of this invention is to recover a purified uranium product from neutron-irradiated uranium. Other objects will in part be pointed out and in part be obvious from the following description.

Broadly speaking, the present invention comprises a method of separating beryllium fluoride and an alkali metal fluoride from a mixture containing same and rare earth fluorides which comprises contacting said mixture with liquid hydrogen fluoride containing no more than about 30 percent water, by weight, until said beryllium fluoride and said alkali metal fluoride are substantially dissolved in said hydrogen fluoride, and thereafter separating a liquid phase containing said beryllium and alkali metal fluoride.

In accordance with a major aspect of the present invention, uranium, lithium and beryllium fluorides contaminated with nuclear reactor poisons may be effectively recovered from such contaminants by a process the initial step of which comprises reacting a mixture of the aforesaid materials with a fluorinating agent which will convert the uranium to gaseous uranium hexafluoride. At the same time the nuclear poison metals are converted to their respective fluorides. The uranium hexafluoride is separated from the balance of the fluorinated composition by volatilization therefrom. If the volatilized $UF_6$ gas requires further purification, it may be distilled and/or passed through a column of granular sodium fluoride where, by a process of selective sorption on the sodium fluoride, a highly purified $UF_6$ product may be obtained.

The fluorinating agents which can be used to fluorinate the original mixture include gaseous fluorine and various halogen fluorides which are liquid at or about room temperature. The particular choice of fluorinating agent will depend on several factors. The prime consideration is that the fluorinating agent and/or conditions of fluorination shall not adversely affect the subsequent operations of the process. If this criterion is met, then the further circumstances which will determine the choice of fluorinating agent will be such factors as the nature and concentration of the initial composition to be treated, and the cost, reactivity and availability of reagents, etc.

We have found that uranium values can be effectively separated from a mixture containing a non-volatile uranium fluoride, beryllium fluoride, an alkali metal fluoride and rare earth fluorides by passing gaseous fluorine through said mixture at a temperature in the range 450–650° C. until the uranium has been converted to the volatile uranium hexafluoride. The degree of uranium recovery and the fluorination temperature will depend on the amount of uranium in the mixture. For example, in a salt mixture containing 5 percent uranium, by weight, a temperature in the range 450–550° C. was found to convert substantially all of the uranium to the volatile uranium hexafluoride; a higher fluorination temperature is generally required where the salt contains lesser amounts of uranium. For the conditions used in forming a $UF_6$ product with a halogen fluoride reference may be had to U.S. Patent 2,830,873.

After removal of the volatile uranium hexafluoride the remaining salt composition will consist principally of lithium fluoride, beryllium fluoride, and the rare earth fluorides. Separation of the fluorides of lithium and beryllium from the fission product rare earth fluorides can be accomplished by selective dissolution in anhydrous or nearly anhydrous liquid hydrogen fluoride. Beryllium fluoride is insoluble in anhydrous hydrogen fluoride and is increasingly soluble in a solution of hydrogen fluoride containing water up to about 30 percent (by weight), whereas in the case of lithium fluoride the reverse is true. Under the same conditions, the rare earth fluorides are relatively insoluble. In these circumstances, it would seem that little if any separation could be effected between beryllium fluoride and the rare earth fluorides. Yet, in accordance with the present invention, the solubility of beryllium fluoride in anhydrous or nearly anhydrous liquid hydrogen fluoride can be markedly changed so that it, together with lithium fluoride and other soluble metal fluorides, can be effective separated from the fission product rare earth fluorides.

We have found that beryllium fluoride will exhibit a useful measure of solubility in anhydrous or nearly anhydrous liquid hydrogen fluoride containing a saturation level of a soluble fluoride salt such as lithium fluoride. Further, in HF containing up to 30 weight percent $H_2O$, the $BeF_2$ solubility is increased by the presence of a soluble fluoride salt such as LiF. This marked change in the solubility behavior of beryllium fluoride is well illustrated in FIG. 1. In FIG. 1 curve A shows the minimum solubility of beryllium fluoride in the presence of a saturation level of lithium fluoride; curve B shows the solubility of beryllium fluoride in anhydrous hydrogen fluoride and in HF solvents containing as much as 30 percent water. For comparison purposes, a third curve (curve C) is included which shows the solubility behavior of beryllium fluoride in this solvent system when less than a saturated level of lithium fluoride is included; and finally curve D shows the solubility of LiF in anhydrous hydrogen fluoride and hydrogen fluoride containing as much as 30 percent water, by weight. Advantage is taken of this solubility phenomenon to effect a clean-cut separation of beryllium fluoride as well as lithium fluoride from the rare earth fission product fluorides.

The peculiar change in the solubility behavior of beryllium fluoride is not entirely understood. It appears, however, that the presence of an HF soluble fluoride salt results in the formation of a complex fluoride of beryllium which is more soluble in hydrogen fluoride than the uncomplexed beryllium salt. Instead of LiF, excess amounts of other alkali fluorides such as NaF, CsF, or RbF and other soluble fluorides such as $NH_4F$ may be used to increase the solubility of $BeF_2$ in liquid hydrogen fluoride, thus enabling the recovery of beryllium values from rare earth fluorides.

In practice, a fluorinated salt composition containing lithium fluoride, beryllium fluoride and rare earth fluorides is mixed with anhydrous liquid hydrogen fluoride or aqueous hydrogen fluoride containing no more than about 30 percent (by weight) water. Under these conditions, the rare earth fluorides will be maintained in a solid insoluble phase while the maximum amount of beryllium fluoride and the lithium fluoride will dissolve in the liquid HF solvent phase. Solution of the beryllium fluoride is not immediate, but takes place over a period of time. The time of solution will depend on such factors as water content, particle size, concentration of HF, beryllium fluoride, and other ingredients contained in the system, but will generally fall within the range .5 to about 24 hours.

The solubility of the rare earth fluorides was found to decrease with increasing HF concentration. We have found that the optimum concentration for achieving high beryllium fluoride solubility and rare earth fluoride insolubility can be attained by using a liquid HF solvent containing no more than about 10 percent by weight water. Higher concentrations of water will result in dissolution of the rare earths as well as more beryllium fluoride thus negating the desired separation. In cases where it is desired to separate lithium fluoride, the amount of solvent added should be the minimal amount necessary to completely dissolve the lithium salt. For optimum dissolution of both lithium fluoride and beryllium fluoride, the solvent to be used is one whose ratio (by weight) of solubilities of LiF and $BeF_2$ is the same as the ratio of said salts in the composition to be dissolved.

Now that the invention has been described in general terms, it will further be illustrated by the following representative example, which shows the manner in which beryllium fluoride and an alkali metal fluoride, such as lithium fluoride, may be separated from rare earth fission product fluorides. In the example, unless otherwise indicated, all operations were conducted at room temperature and pressure.

EXAMPLE

A salt mixture containing LiF (48 wt. percent), $BeF_2$ (52 wt. percent), 0.2 mole percent mixed rare earth fluorides and spiked with trace quantities of rare earth fission products was crushed to powder and separated into four equal portions. Each portion was mixed with a volume of liquid HF containing small amounts of water as indicated in Table I below. The resultant mixtures were contacted for a period of 20 hours at 12° C., during which time they were periodically analyzed to determine the solubility of LiF and $BeF_2$ in the solvent. The results are summarized in Table I below.

Table I

[Salt in solution, mg/g. of solution]

| Time | 79.5 wt. percent HF | | 89.5 wt. percent HF | | 95 wt. percent HF | | 98 wt. percent HF | |
|---|---|---|---|---|---|---|---|---|
| | LiF | $BeF_2$ | LiF | $BeF_2$ | LiF | $BeF_2$ | LiF | $BeF_2$ |
| 15 min | 28 | 33 | 50 | 44 | 40 | 17 | 28 | 4 |
| 1 hr | 29 | 35 | 51 | 50 | 43 | 17 | 22 | 3 |
| 5 hr | 21 | 65 | 74 | 102 | 70 | 36 | ¹ 71 | 22 |
| 20 hr | 34 | 100 | 76 | 92 | ¹ 88 | 53 | ¹ 60 | 22 |

¹ Essentially all the component indicated had dissolved and therefore the solubility may be higher than the value given.

It will be noted that the solubility of beryllium fluoride, relative to the solubility of lithium fluoride, was quite high in the HF mixtures shown in Table I.

The marked change in the solubility behavior of $BeF_2$ is further contrasted by comparison with curves B and C of FIG. 1, which show the solubility behavior of $BeF_2$ in the absence of lithium fluoride and in HF solutions containing less than a saturation level of the soluble LiF salt.

Each of the HF solutions of Table I was filtered through a porous nickel filter membrane, and radiochemical analyses were performed on the filtrates. The results (as summarized in Table II below) show that the rare earths, as represented by cerium, were effectively separated from the salt mixture. The solubility of the rare earths decreased as the hydrogen fluoride concentration increased, i.e., as the HF became anhydrous. No rare earth activity other than cerium was detected in the HF solutions of Table I.

Table II

LiF—$BeF_2$ (63–37 MOLE PERCENT)+~0.2 MOLE PERCENT RARE EARTH FLUORIDE+TRACE FISSION PRODUCTS BETWEEN 1 AND 2 YEARS OLD

[Activity in original salt and in HF solution, counts×$10^4$/min./g. of salt]

| Fission Product | Original Salt | 79.5 wt. percent HF | 89.5 wt. percent HF | 95 wt. percent HF | 98 wt. percent HF |
|---|---|---|---|---|---|
| Cerium | 510 | 7.9 | 3.6 | 1.3 | 0.28 |

We have described a specific embodiment of this invention in which the initial step is to volatilize uranium as $UF_6$ from a LiF—$BeF_2$ salt containing uranium and rare earth fluorides. However, it should be noted that we need not resort to an initial uranium volatilization step. Thus, for example, consider a composition containing $UF_4$, $ThF_4$, $LiF_2$, $BeF_2$ including plutonium fluoride, neptunium fluoride and rare earth and other fission product fluorides. The oxidation state of the plutonium and of the neptunium is indeterminate, but may vary from +3 to +6. To this fluoride salt mixture is added sufficient liquid anhydrous or nearly anhydrous hydrogen fluoride to form a solution saturated with respect to lithium fluoride. The saturated mixture is then mixed until the maximum solubility of lithium fluoride and beryllium fluoride is attained. This is followed by solid separation such as filtration or centrifugation of the mixed solution. The solid phase will contain uranium tetrafluoride, thorium tetrafluoride, plutonium fluoride, neptunium fluoride and the insoluble rare earth fission product fluorides. The filtrate will consist of a HF solution saturated in lithium containing beryllium fluoride and soluble fission product fluorides such as CsF and SrF. To recover the lithium fluoride and beryllium fluoride from the HF solvent the filtrate can then be evaporated to remove the hydrogen fluoride. The solvent may then subsequently be reused. To separate the uranium from the thorium, plutonium, neptunium and rare earth fission product fluorides, the separated solid phase may be fluorinated with gaseous fluorine or a halogen fluoride which is liquid at or about room temperature to form a volatile uranium hexafluoride product. The remaining solid phase may be processed to recover the thorium and plutonium by selective solvent extraction.

Since many embodiments may be made of the invention hereinbefore described and since many variations of this invention may occur to those skilled in the art, it will be clearly understood that the scope of this invention is not to be limited to the particulars disclosed therein, but is to be defined by the following claims.

We claim:
1. A method of separating beryllium fluoride and an alkali metal fluoride from a mixture containing same and rare earth fluorides which comprises contacting said mixture with liquid hydrogen fluoride solution containing no more than about 30 percent water, by weight and saturated with a fluoride salt characterized by its solubility in anhydrous hydrogen fluoride, until said beryllium fluoride and said alkali metal fluoride are substantially dissolved in said hydrogen fluoride, and thereafter separating a liquid phase containing said beryllium and alkali metal fluoride.

2. The method of claim 1, wherein the alkali fluoride salt is lithium fluoride.

3. A method of separating beryllium fluoride from a mixture containing same and rare earth fluorides which comprises contacting said mixture with liquid hydrogen fluoride solution containing no more than about 30 percent by weight water and saturated with a fluoride salt characterized by its solubility in anhydrous hydrogen fluoride until the beryllium fluoride is substantially dissolved in said solution, and thereafter separating a liquid phase containing said beryllium fluoride.

4. A method of separating beryllium fluoride and an alkali metal fluoride from a mixture containing same and rare earth fluorides which comprises contacting said mixture with a solvent comprising liquid hydrogen fluoride containing no more than about 30 percent by weight water and an inorganic fluoride salt characterized by its solubility in anhydrous hydrogen fluoride, refluxing the resultant composition until the beryllium fluoride is substantially dissolved, and thereafter separating a liquid phase containing said beryllium fluoride and alkali metal fluoride.

5. The method of claim 4 wherein the alkali metal fluoride is lithium fluoride.

6. The method of claim 4, wherein the solvent is anhydrous liquid hydrogen fluoride.

7. In a method of separating beryllium fluoride and alkali metal fluoride values from a neutron irradiated composition containing beryllium fluoride, at least one alkali metal fluoride, fission product fluorides of neutron irradiated uranium and a soluble fluoride of a nuclear fuel selected from the group consisting of uranium, thorium and plutonium, the steps which comprise contacting said composition with a liquid hydrogen fluoride solvent containing no more than about 30 percent water by weight and a metal fluoride salt soluble in anhydrous hydrogen fluoride, mixing the resultant composition until said beryllium fluoride and said alkali metal fluoride have dissolved in said solvent, and thereafter separating a liquid phase containing said beryllium fluoride and said alkali metal fluoride.

8. The method of claim 7, wherein the solvent is saturated with respect to an alkali metal fluoride.

9. A method of separating beryllium fluoride and alkali metal fluoride values from a neutron irradiated mixture containing said values and including a fissionable uranium containing a fissionable uranium isotope and neutron irradiation products thereof, the method which comprises, in combination, contacting said mixture with a fluorinating agent selected from the group consisting of gaseous fluorine and a halogen fluoride which is liquid at or about room temperature to thereby convert said uranium to volatile uranium hexafluoride and said irradiation products to their respective fluorides, separating the thus produced uranium hexafluoride, contacting the residual fluorinated mixture with a liquid hydrogen fluoride solvent containing no more than about 30 percent by weight water and saturated with respect to an inorganic fluoride salt which is soluble in anhydrous hydrogen fluoride, mixing said contacted composition until substantially all of said beryllium fluoride has dissolved in said solvent, and thereafter separating a liquid phase containing soluble metal fluorides.

10. The method of claim 9, wherein the solvent is anhydrous hydrogen fluoride.

11. The method of claim 9, wherein the alkali metal fluoride is lithium fluoride.

12. In a method of recovering beryllium fluoride and an alkali metal fluoride from a neutron irradiated composition containing beryllium fluoride, at least one alkali metal fluoride, fission product fluorides of neutron irradiated uranium and a soluble fluoride of a nuclear fuel selected from the group consisting of uranium, thorium and plutonium, the steps which comprise contacting said mixture with a liquid hydrogen fluoride solvent containing no more than about 30 percent by weight water and saturated with respect to an alkali metal fluoride, mixing the resultant composition for a period of time sufficient to dissolve said beryllium fluoride and thereafter separating a liquid phase containing soluble beryllium values.

13. In a method of recovering beryllium fluoride and an alkali metal fluoride from a neutron irradiated composition containing beryllium fluoride, at least one alkali metal fluoride, fission product fluorides of neutron irradiated uranium and a soluble fluoride of a nuclear fuel selected from the group consisting of uranium, thorium and plutonium, the steps which comprise contacting said mixture with a liquid hydrogen fluoride solvent containing no more than about 30 percent by weight water, adjusting the concentration of said alkali metal fluoride in the resultant composition until a saturated solution of said alkali metal fluoride is obtained and then mixing the alkali metal fluoride saturated composition for a period of time to dissolve said beryllium fluoride and thereafter separating a liquid phase containing soluble beryllium and other soluble metal fluoride values.

14. The method of claim 12, wherein the alkali metal fluoride is lithium fluoride.

References Cited in the file of this patent
UNITED STATES PATENTS

| 2,811,413 | McMillan | Oct. 29, 1957 |
| 2,820,692 | Shor et al. | Jan. 21, 1958 |
| 2,830,873 | Katz et al. | Apr. 15, 1958 |

OTHER REFERENCES

Comey and Hahn: "Chemical Solubilities," 2nd edition, pages 215, 364, 439 and 458 (1921).

Jacke et al.: "J. of Phys. Chem.," vol. 52, pages 1106–1109, December 1952.

Technical Progress Reviews, vol. 2, No. 1, pages 21 and 35, January 1959.

Ornl 2626, pages 78–90, Jan. 23, 1959.